United States Patent

Hengelsberg et al.

Patent Number: 5,496,378
Date of Patent: Mar. 5, 1996

[54] IMIDAZOLYMETHYLATED COPPER PHTHALOCYANINE DYES

[75] Inventors: Heidi Hengelsberg, Mannheim; Manfred Ruske, Ludwigshafen; Udo Mayer, Frankenthal, all of Germany

[73] Assignee: BASF Aktiengesellschaft, Ludwigshafen, Germany

[21] Appl. No.: 304,191

[22] Filed: Sep. 12, 1994

[30] Foreign Application Priority Data

Sep. 11, 1993 [DE] Germany .................. 43 30 864.3

[51] Int. Cl.$^6$ .................. C09B 47/04
[52] U.S. Cl. .................. 8/436; 8/655; 8/661; 8/918; 8/919; 8/518; 540/127; 540/139
[58] Field of Search .................. 540/127, 139; 8/518, 655, 661, 918, 919, 920, 527, 436

[56] References Cited

U.S. PATENT DOCUMENTS 4,451,398  5/1984  Patsch et al. .................. 260/245.73

FOREIGN PATENT DOCUMENTS 0034725  2/1981  European Pat. Off. .
1157324  11/1963  Germany .
2631265  1/1977  Germany .
1085018  9/1967  United Kingdom .

*Primary Examiner*—Margaret Einsmann
*Attorney, Agent, or Firm*—Oblon, Spivak, McClelland, Maier & Neustadt

[57] ABSTRACT

Basic dyes of the formula

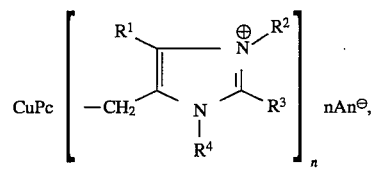

where
n is from 1 to 3,
CuPc is a copper phthalocyanine radical,
$R^1$ is hydrogen or $C_1$–$C_4$-alkyl,
$R^2$ is $C_1$–$C_4$-alkyl,
$R^3$ is hydrogen or $C_1$–$C_4$-alkyl,
$R^4$ is $C_1$–$C_4$-alkyl and
$An^\ominus$ is the equivalent of an anion,
with the proviso that $R^1$ and $R^3$ are not both hydrogen, are useful for dyeing or printing polymeric material.

12 Claims, No Drawings

IMIDAZOLYMETHYLATED COPPER PHTHALOCYANINE DYES

The present invention relates to novel basic dyes of the formula I

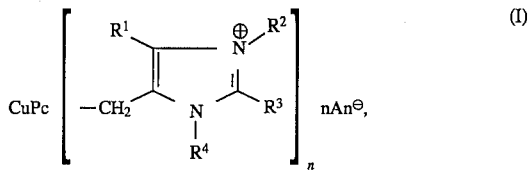

where
n is from 1 to 3,
CuPc is a copper phthalocyanine radical,
$R^1$ is hydrogen or $C_1$–$C_4$-alkyl,
$R^2$ is $C_1$–$C_4$-alkyl,
$R^3$ hydrogen or $C_1$–$C_4$-alkyl,
$R^4$ is $C_1$–$C_4$-alkyl and
$An^\ominus$ is the equivalent of an anion,
with the proviso that $R^1$ and $R^3$ are not both hydrogen, to a process for preparing same, to dye formulations comprising the novel dyes, and to the use of the novel dyes for dyeing or printing polymeric material.

EP-A-34 725 discloses dyes which are similar to those of the formula I, but contain fewer alkyl groups.

However, it has been found that the dyes described therein do not possess satisfactory solubility.

It is an object of the present invention to provide novel basic dyes based on imidazolylmethylated copper phthalocyanines that shall possess excellent solubility.

We have found that this object is achieved by the basic dyes of the formula I more particularly described at the beginning. $R^1$, $R^2$, $R^3$ and $R^4$ are each for example methyl, ethyl, propyl, isopropyl, butyl, isobutyl, sec-butyl or tert-butyl.

Suitable anions for the equivalent $An^\ominus$ include for example fluoride, chloride, bromide, iodide, sulfate, acetate, propionate, mono-, di- or trichloroacetate, lactate, methoxyacetate, citrate, succinate, methanesulfonate, benzenesulfonate or 2- or 4-methylbenzenesulfonate.

Preference is given to basic dyes of the formula I where $R^1$, $R^2$ and $R^4$ are each methyl and $R^3$ is hydrogen.

Preference is further given to basic dyes of the formula I where n is from 2 to 3, in particular about 3.

Owing to the synthesis of the below-specified copper phthalocyanine of the formula II, the basic dyes of the formula I are usually mixtures; that is, n is generally not an integer.

We have also found that basic dyes of the formula I according to the invention are obtained with advantage on reacting a copper phthalocyanine of the formula II

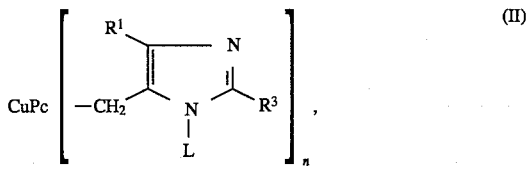

where n, CuPc, $R^1$ and $R^3$ are each as defined above and L is hydrogen or $C_1$–$C_4$-alkyl, with an alkylating agent of the formula III $$R^2\text{—X} \quad \text{(III),}$$

where $R^2$ is as defined above and X is a leaving group.

Suitable leaving groups X include for example chlorine, bromine, iodine, methosulfate, ethosulfate or a radical of the formula $Y\text{—}SO_3$, where Y is phenyl or 2- or 4-methylphenyl.

The treatment of the copper phthalocyanine of the formula II with the alkylating agent III is generally carried out in an aqueous medium at from 20° to 50° C., preferably at from 25° to 45° C., in the presence of a base.

Suitable bases include for example sodium carbonate, potassium carbonate, magnesium oxide, magnesium carbonate, sodium acetate and potassium acetate.

The amounts used per mole of copper phthalocyanine II are generally from 5 to 8 mol, preferably from 5 to 6.5 mol, of alkylating agent III and from 1 to 3 mole equivalents, preferably from 1 to 2.1 mole equivalents, of base.

The preparation of the basic dyes of the invention is advantageously effectuated by initially charging copper phthalocyanine II, water and base and adding the alkylating agent at from 20° to 50° C. Thereafter the mixture is stirred at the abovementioned temperature for from 1 to 3 hours. The resulting reaction mixture is directly ready-to-use after cooling down or else can be admixed with water, acetic acid, lactic acid, sulfuric acid or a mixture thereof.

It is also possible to prepare the novel dyes of the formula I by adding an aqueous suspension of the copper phthalocyanine II to the alkylating agent III together with the base. In this version, it is possible to use an about 10–20% stronger suspension than in the abovementioned procedure.

The basic dyes of the formula I according to the invention can likewise be obtained by carrying out the alkylation in two stages. In the first stage, a 10–15% strength by weight aqueous suspension of the copper phthalocyanine of the formula II is reacted with the alkylating reagent III in the presence of a base. The resulting solution is again admixed in the next step with the copper phthalocyanine II in the form of an aqueous press cake having a solids content of ≧35% by weight or else in the form of a dried powder. The reaction is subsequently continued by addition of further alkylating agent III. The amount of copper phthalocyanine II added in the second step depends on the final concentration desired for the solution, which generally ranges from 22 to 34% by weight.

The copper phthalocyanines II are known per se, cf. for example EP-A-34 725, or can be obtained by the methods mentioned therein.

The novel basic dyes of the formula I have excellent solubility in water, and they are consequently preferably used in the form of liquid brands.

Accordingly, the present invention also provides dye formulations comprising, in each case based on the weight of the dye formulation, from 22 to 34% by weight, preferably from 26 to 32% by weight, of a basic dye of the formula I and from 58 to 70% by weight, preferably from 60 to 68% by weight, of water. The dye formulations of the invention generally additionally contain salts as remainder (difference to 100% by weight).

The basic dyes of the formula I according to the invention can be used alone, mixed with each other, and together with other cationic or anionic compounds in the form of their solutions or in the form of powders or granules. They are advantageously suitable for dyeing or printing polymeric material, in particular paper stock, but also cellulose, cotton, leather, bast fibers, hemp, flax, sisal, jute, coir or straw.

The dyes can be used with advantage in the production of pulp-colored, sized or unsized paper. They can likewise be used for coloring paper by the dip method.

Dyeing of paper, leather or cellulose is by methods known per se.

The novel dyes can also be used for dyeing, padding or printing polyacrylonitrile textiles or anionically-modified polyamide or polyester textiles.

The Examples which follow illustrate the invention.

EXAMPLE 1

150 g of imidazolylmethylated copper phthalocyanine of the formula

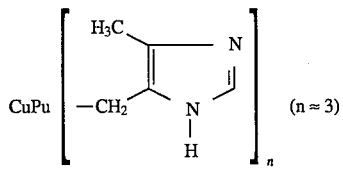

and 10 g of magnesium oxide were suspended in 430 g of water. Then 115 g of dimethyl sulfate were added dropwise at an internal temperature from 30° to 45° C. On completion of the addition the mixture was stirred at the abovementioned temperature for 60 min and then at from 80° to 90° C. for 1.5 h. The low-viscosity solution obtained on cooling down is immediately ready-to-use. It is safely storable and contains about 28% by weight of the dye of the formula

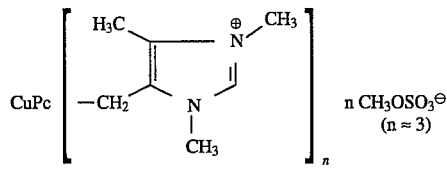

It dissolves readily in water without leaving a residue. The liquid dye dyes paper in greenish blue shades.

EXAMPLE 2

Example 1 was repeated with the magnesium oxide replaced by 36 g of sodium acetate, affording the dye of Example 1.

The dye solution has a long storage life.

EXAMPLE 3

Example 1 was repeated with the magnesium oxide replaced by a mixture of 5 g of magnesium oxide and 18 g of sodium acetate, affording a dye solution of similar solubility and storage stability.

EXAMPLE 4

Example 1 was repeated with the dimethyl sulfate replaced by 140 g of diethyl sulfate, affording the dye of the formula

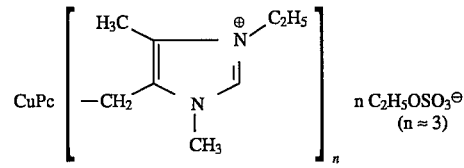

The liquid formulation of the dye likewise has low viscosity and a long storage life.

EXAMPLE 5

A solution of the dye described in Example 1, having the same application properites, was obtained by metering a suspension of 150 g of imidazolylmethylated copper phthalocyanine of the formula

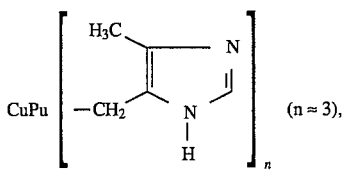

10 g of magnesium oxide and 430 g of water into 115 g of dimethyl sulfate. The rate of the dropwise addition was controlled in such a way that the internal temperature never exceeded from 30° to 45° C. On completion of the addition the rest of the procedure was as described in Example 1.

By this process variant it is also possible to use a suspension of copper phthalocyanine, the base and water whose copper phthalocyanine content is from 10 to 20% higher than in Example 1. The dye solution obtained is then converted into a stable dye formulation by addition of an appropriate amount of water, acetic acid, lactic acid, sulfuric acid or a mixture thereof.

EXAMPLE 6

220 g of a 15% strength by weight suspension of the imidazolylmethylated copper phthalocyanine of the formula

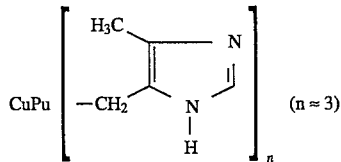

were admixed with 3.6 g of magnesium oxide. Then 24.5 g of dimethyl sulfate were added dropwise at from 30° to 45° C. On completion of the addition, 198.4 g of a 38.2% strength by weight aqueous press cake of the abovementioned copper phthalocyanine, 8 g of magnesium oxide and then, dropwise, 56.3 g of dimethyl sulfate were added. To complete the reaction, the mixture was subsequently stirred for 45 min, and the rest of the procedure was as described in Example 1. The dye solution obtained was admixed with 21 g of 30% strength by weight acetic acid and has similar application properties to the solution described in Example 1.

The same method gives the dyes listed in the table below. Their liquid formulations likewise have a long shelf life.

TABLE

| Ex. No. | $R^1$ | $R^2$ | $R^3$ | $R^4$ | $An^\ominus$*) |
|---|---|---|---|---|---|
| 7 | H | $CH_3$ | $CH_3$ | $CH_3$ | $CH_3OSO_3^\ominus$ |
| 8 | $CH_3$ | $CH_3$ | $C_2H_5$ | $CH_3$ | $CH_3OSO_3^\ominus$ |

TABLE-continued

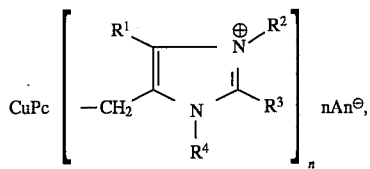

| Ex. No. | $R^1$ | $R^2$ | $R^3$ | $R^4$ | $An^{\ominus}$*) |
|---|---|---|---|---|---|
| 9 | H | $CH_3$ | $C_2H_5$ | $CH_3$ | $CH_3OSO_3^{\ominus}$ |
| 10 | H | $CH_3$ | $CH(CH_3)_2$ | $CH_3$ | $CH_3OSO_3^{\ominus}$ |
| 11 | H | $C_2H_5$ | $CH_3$ | $CH_3$ | $C_2H_5OSO_3^{\ominus}$ |
| 12 | H | $C_3H_7$ | $CH_3$ | $CH_3$ | $Br^{\ominus}$ |
| 13 | H | $C_2H_5$ | $CH_3$ | $C_2H_5$ | $C_2H_5OSO_3^{\ominus}$ |
| 14 | H | $C_2H_5$ | $C_2H_5$ | $C_2H_5$ | $C_2H_5OSO_3^{\ominus}$ |
| 15 | $CH_3$ | $C_2H_5$ | $C_2H_5$ | $C_2H_5$ | $C_2H_5OSO_3^{\ominus}$ |
| 16 | H | $C_3H_7$ | $CH_3$ | $C_2H_5$ | $Br^{\ominus}$ |

*)Depending on the acid added, the anions are generally mixtures of those mentioned in the Table with those derived from the particular acid added.

We claim:

1. Basic dyes of the formula I

(I)

where n is from 1 to 3,

CuPc is a copper phthalocyanine radical, $R^1$ is hydrogen or $C_1$–$C_4$-alkyl, $R^2$ is $C_1$–$C_4$-alkyl, $R^3$ is hydrogen or $C_1$–$C_4$-alkyl, $R^4$ is $C_1$–$C_4$-alkyl, and $An^{\ominus}$ is an anion, with the proviso that $R^1$ and $R^3$ are not both hydrogen.

2. Basic dyes as claimed in claim 1 wherein $R^1$, $R^2$ and $R^4$ are each methyl and $R^3$ is hydrogen.

3. Basic dyes as claimed in claim 1 wherein n is from 2 to 3.

4. A process for preparing the basic dyes of claim 1, which comprises reacting a copper phthalocyanine of the formula II

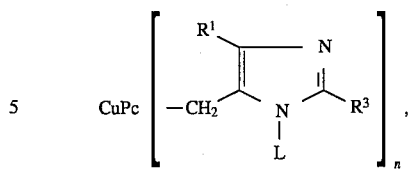

(II)

where n, CuPc, $R^1$ and $R^3$ are each as defined above and L is hydrogen or $C_1$–$C_4$-alkyl, with an alkylating agent of the formula III $$R^2\text{—}X \quad \text{(III)},$$

where $R^2$ is as defined above and X is a leaving group.

5. Dye formulations containing, in each case based on the weight of the dye formulation, from 22 to 34% by weight of a basic dye of the formula I as claimed in claim 1 and from 58 to 70% by weight of water.

6. The process of claim 4, wherein said copper phthalocyanine of the formula (II) is reacted with said alkylating agent of the formula (III) in an aqueous medium at a temperature from 20°–50° C., in the presence of a base.

7. The basic dye of claim 1, wherein said anion is selected from the group consisting of fluoride, chloride, bromide, iodide, sulfate, acetate, propionate, mono-chloroacetate, dichloroacetate, tri-chloroacetate, lactate, methoxyacetate, citrate, succinate, methane sulfonate, benzenesulfonate, 2-methyl-benzenesulfonate and 4-methyl-benzenesulfonate.

8. A method of modifying the color of a material comprising dying, padding or printing the material with a copper phthalocyanine of the formula (I) as set forth in claim 1.

9. A method of dyeing a material comprising mixing a basic dye of claim 1 with water, and dyeing a material therewith.

10. The method of claim 9, wherein said material is selected from the group consisting of paper, cellulose, cotton, leather, bast fibers, hemp, flax, sisal, jute, coir and straw.

11. The method of claim 9, wherein said material is selected from the group consisting of paper, leather, or cellulose.

12. The process of claim 4 wherein said leaving group X is selected from the group consisting of chlorine, bromine, iodine, methosulfate, ethosulfate, and a radical of the formula $Y\text{—}=SO_3$, wherein Y is phenyl, 2-methyl phenyl or 4-methyl phenyl.

* * * * *